US009612314B2

United States Patent
Xia et al.

(10) Patent No.: US 9,612,314 B2
(45) Date of Patent: Apr. 4, 2017

(54) METHOD AND SYSTEM FOR GUIDING THE POSITION

(71) Applicant: SPREADTRUM COMMUNICATIONS (SHANGHAI) CO., LTD., Pudongxinqu, Shanghai (CN)

(72) Inventors: Lu Xia, Shanghai (CN); Hengzhuang Jin, Shanghai (JP); Haipeng Liu, Shanghai (CN)

(73) Assignee: Spreadtrum Communications (Shanghai) Co., Ltd., Pudongxinqu, Shanghai (CN)

( * ) Notice: Subject to any disclaimer, the term of this patent is extended or adjusted under 35 U.S.C. 154(b) by 0 days.

(21) Appl. No.: 14/236,015

(22) PCT Filed: Jan. 9, 2014

(86) PCT No.: PCT/CN2014/070416
§ 371 (c)(1),
(2) Date: Jan. 29, 2014

(87) PCT Pub. No.: WO2014/206067
PCT Pub. Date: Dec. 31, 2014

(65) Prior Publication Data
US 2016/0252605 A1    Sep. 1, 2016

(30) Foreign Application Priority Data

Jun. 27, 2013 (CN) .......................... 2013 1 0264614

(51) Int. Cl.
*G01S 19/48* (2010.01)
*G01S 5/02* (2010.01)
(Continued)

(52) U.S. Cl.
CPC ............ *G01S 5/0263* (2013.01); *G01C 21/20* (2013.01); *G01S 19/48* (2013.01); *G01S 19/49* (2013.01)

(58) Field of Classification Search
CPC ........ G01S 19/48; G01S 5/0263; G01C 21/20
(Continued)

(56) References Cited

U.S. PATENT DOCUMENTS 6,037,936 A * 3/2000 Ellenby .................. G01C 17/34
348/211.8
6,754,137 B1 * 6/2004 Bourquin ........... G04C 17/0091
368/10

(Continued)

FOREIGN PATENT DOCUMENTS

CN    101039475 A    9/2007
CN    101179851 A    5/2008

*Primary Examiner* — Harry Liu
(74) *Attorney, Agent, or Firm* — Ohlandt, Greeley, Ruggiero & Perle, L.L.P.

(57) ABSTRACT

The present invention discloses a system for guiding the position and the method thereof, which belongs to the technical field of position navigation, wherein it comprises a position capturing device and a treatment device. The position capturing device is connected to the treatment device, which comprises a positioning component, an angular speed detection component and a direction detection component. The treatment device is connected to the display screen of the mobile terminal. The method comprises capturing the current position and the preconfigured target position of the mobile terminal by the said system; and the treatment device acquires the route between the current position and the target position by processing the preconfigured map data. The advantageous effects of the above technical scheme are that as follows: adopting the system for (Continued)

guiding the position and the method thereof makes the navigation more accurately and satisfies the demand of the user.

10 Claims, 6 Drawing Sheets

(51) Int. Cl.
*G01C 21/20* (2006.01)
*G01S 19/49* (2010.01)

(58) Field of Classification Search
USPC .................................................. 342/357.31
See application file for complete search history.

(56) References Cited

U.S. PATENT DOCUMENTS

| | | | | |
|---|---|---|---|---|
| 2009/0306892 | A1* | 12/2009 | Malka | ........................ F41G 3/02 |
| | | | | 701/469 |
| 2011/0293260 | A1* | 12/2011 | Daigo | .................... G01S 5/0263 |
| | | | | 396/310 |
| 2012/0136573 | A1* | 5/2012 | Janardhanan | ........ G01C 21/165 |
| | | | | 701/512 |

* cited by examiner

Step 1. The positioning component determines the current position of the mobile terminal and the preconfigured target position;

Step 2. The angular speed detection component detects the current posture of the mobile terminal;

Step 3. The direction detection component detects the current direction of the mobile terminal;

Step 4. The position capturing device acquires the real direction of the mobile terminal according to the current posture and the current direction;

Step 5. The position capturing device transmits the data package including the above data to the treatment device;

Step 6. The treatment device acquires the route between the current position and the target position by treating on the preconfigured map data and displays the results on the display screen of the mobile terminal.

FIG. 7

METHOD AND SYSTEM FOR GUIDING THE POSITION

TECHNICAL FIELD

The present invention relates to the technical field of position navigation, more specifically, to a method and a system for guiding the position.

BACKGROUND OF THE INVENTION

When being in an unfamiliar city or area, the people usually just have the information of the specific address or the section of the road. They are not familiar with the array of the local road sections and can not find the destination rapidly and accurately. In order to solve the above problem, people will generally carry a portable GPS (Global Positioning System) navigator to locate the target position and find the optimal route for going to the destination. In the practical application, the GPS navigator is generally applied to the carried mobile terminal of the user, such as the mobile phone or the tablet computer, which is portable and is of the multiple functions in a terminal device simultaneously.

The traditional mobile terminal with the GPS navigation function is with the following navigation problems, Firstly, the accuracy of navigation is not high. Sometimes the range is within the radius of 500-1000 meters, which is not conducive for the user to find the destination.

Secondly, when the user uses the navigation system, the navigation system is not able to determine the position of user accurately, thereby the navigation system is not able to determine or postpones determining the direction of moving, which brings a big trouble in the navigation.

Chinese Patent Publication No. CN101179851 discloses a positioning system of the navigation mobile phone and the method thereof, a system service center and a navigation mobile phone, wherein a tracking module and a positioning module are configured in the navigation mobile phone. The positioning module is used for acquiring the current GPS positioning information of the navigation mobile phone and transmitting it to the service center. The tracking module is used for acquiring the SIM card information and the current GPS positioning information of the navigation mobile phone and transmitting them to the service center by the wireless transmission, when the service center detected that the identity of the user is abnormal. The above technical scheme does not cover the location the current posture of the mobile terminal.

Chinese patent Publication No. CN101039475 discloses a method of realizing the mutual navigation of the mobile phone, which comprises the following steps: A, determining the target address that needs to be assisted; B, the transmitting terminal acquires the navigation database to configure the target address and transmits it to the receiving terminal; C, according to the received target address information, the receiving terminal calls the navigation database to make the path planning for the target address and feeds back the results of the path planning to the transmitting terminal. The invention is based on the application of MMS/GSM/GPRS/WAP communication network. By the smart phone of the coadjutant and the mastery degree of the rode conditions, the other people can be assisted to perform the navigation and to inquire easily, which avoids the problem that the mobile phones of different types used by the two parties will not perform the mutual navigation. The range of the applications is widened. However, the above technical scheme does not cover the location the current posture of the mobile terminal.

SUMMARY OF THE INVENTION

According to the defects existing in the prior art, the present invention provides a system for guiding the position and the method thereof, comprising:

a system for guiding the position applied to the mobile terminal, wherein the system comprises a position capturing device and a treatment device; the position capturing device is connected to the treatment device; the treatment device is connected to the display screen of the mobile terminal;

the position capturing device is used to determine the current position of the user and a preconfigured target position; according to the internal map data, the treatment device acquires the route between the current position and the target position by treating;

the position capturing device comprises a positioning component, an angular speed detection component and a direction detection component; the positioning component is used to determine the current position and target position of the mobile terminal; the angular speed detection component is used to determine the current posture of the mobile terminal; the direction detection component is used to determine the current direction of the mobile terminal.

Preferably, according to the above system, wherein, the angular speed detection component is the angular speed sensor of the mobile terminal.

Preferably, according to the above system, wherein, the angular speed sensor is a three-axis acceleration sensor.

Preferably, according to the above system, wherein, the direction detection component is a magnetic sensor.

Preferably, according to the above system, wherein, the system further comprises an image capturing device which is connected to the display screen of the mobile terminal; the image capturing device is used for capturing the image data around the user and displaying the image data on the display screen of the mobile terminal.

Preferably, according to the above system, wherein, the system further comprises an indication device which is connected to the display screen of the mobile terminal; the indication device determines the deviation of the direction between the image capturing device and the target position according to the image data shown on the display screen and alerts the user by displaying the corresponding indication information on the display screen.

Preferably, according to the above system, wherein, the image capturing device is a camera.

Preferably, according to the above system, wherein, the positioning component is a GPS device and/or a wireless network positioning device.

Preferably, according to the above system, wherein, the position capturing device further comprises an altitude detection component which is used for capturing the current position of the mobile terminal in altitude; the information indicating the current position in altitude is included in the information indicating the current position.

Preferably, according to the above system, wherein, the altitude detection component is a barometer.

A method for guiding the position applied to the mobile terminal, wherein the above system for guiding the position is adopted, comprises:

Step 1, the positioning component of the mobile terminal locates the current position of the mobile terminal;

Step 2, the direction detection component of the mobile terminal determines the current direction of the mobile terminal;

Step 3, the angular speed detection component of the mobile terminal determines the current posture of the mobile terminal;

Step 4, the position capturing device acquires the real direction of the mobile terminal according to the current direction and the current posture.

Step 5, the position capturing device transmits the data package comprising the current position and the real direction to the treatment device; the treatment device acquires the route between the current position and the preset target position by treating;

Step 6, the treatment device displays the distance and real direction on the display screen of the mobile terminal.

Preferably, according to the above method, wherein it comprises an image capturing device which is connected to the display screen of the mobile terminal; the image capturing device is used for capturing the image data around the user and for displaying the image data on the display screen of the mobile terminal;

it further comprises an indication device which is connected to the display screen of the mobile terminal; the indication device determines the deviation of the direction between the image capturing device and the target position according to the image data shown on the display screen and alerts the user by displaying the indicating arrow on the display screen;

the image capturing device is adopted to capture the surrounding image data and to display the data on the display screen; the image data is provided to the users for confirming the object around the position where the mobile terminal is located;

the indication device marks the indication information of the deviation of the direction between the image capturing device and the target position on the display screen to alert the user according to the image data.

The advantageous effects of the technical scheme are that as follows: adopting the position capturing device to locate the current position and the target position of the mobile terminal simultaneously, and determining the data of the current posture and the data of the direction of the mobile terminal, which makes the navigation more accurately and meets the requirement of the user.

BRIEF DESCRIPTIONS OF THE DRAWINGS

FIG. 7 shows a flow chart of the method for guiding the position in the embodiment of the present invention.

DESCRIPTIONS OF THE PREFERRED EMBODIMENT

The present invention will be further illustrated in combination with the following figures and embodiments, but it should not be deemed as limitation of the present invention.

People are not able to find the position of the destination rapidly just by jointly using the combination of the maps and compasses when they are in an unfamiliar area, especially in a crowded street. Therefore, a few manufacturers integrated the traditional GPS navigator into the mobile terminal, i.e., the function of the GPS navigation is added into the mobile terminal, which enables the user to open the function of the GPS navigation and to perform the corresponding locating. Consequently, the user will find the position of the destination rapidly with the help of the above mobile terminal.

However, the traditional mobile terminal with the GPS function is unable to capture the position of the mobile terminal itself accurately, such as the angle, direction and so on. Therefore, the general location of the mobile terminal can be captured; however the altitude of the position where the mobile terminal is located, for example, on the ground or on the second floor, or the current direction of the mobile terminal is not determined. Hence, it is necessary to invent a system for accurately guiding the position of the mobile terminal.

Figure 1:
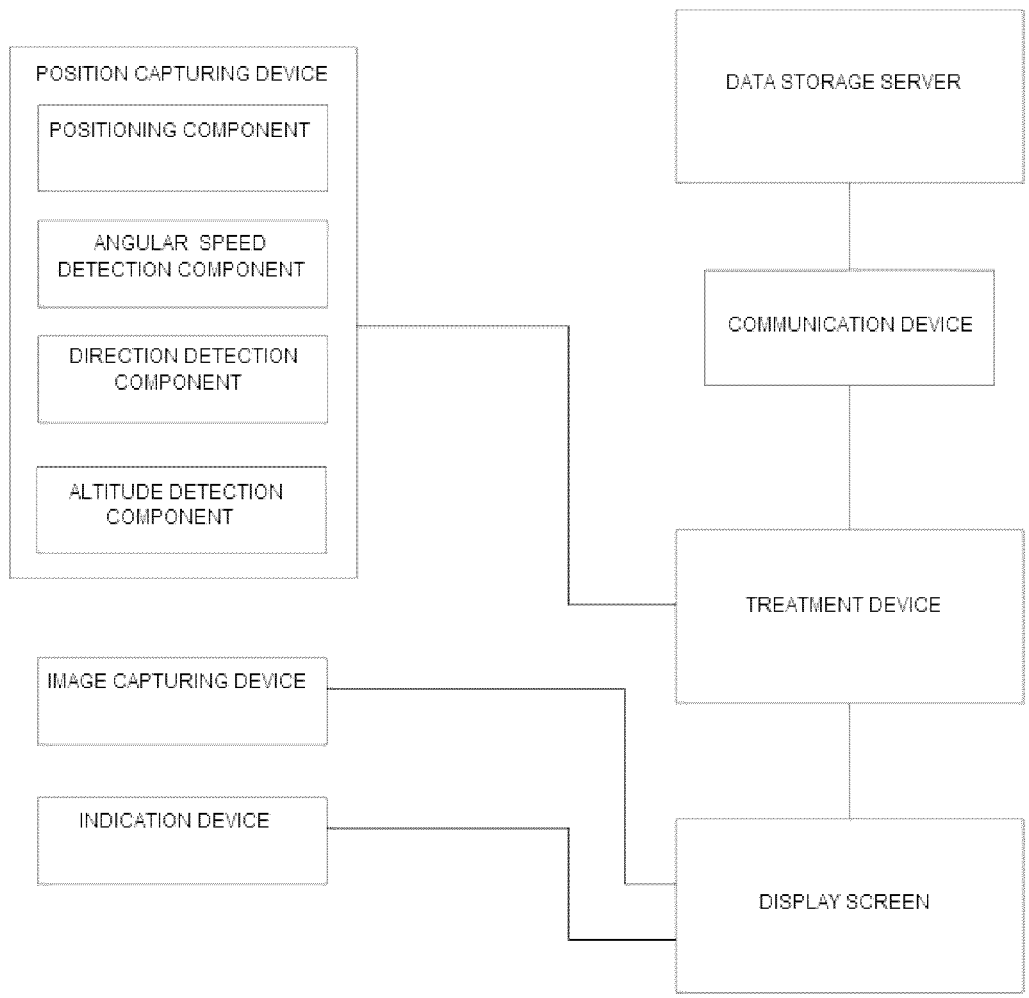
FIG. 1 shows a structure diagram of the system for guiding the position in the embodiment of the present invention.

The system for guiding the position as shown in FIG. 1, which comprises a position capturing device and a treatment device. The position capturing device is connected to the treatment device. The treatment device is connected to the display screen of the mobile terminal.

The position capturing device comprises an angular speed detection component, a positioning component and a direction detection component.

In the embodiment of the present invention, the positioning component is a GPS device and/or a wireless (WiFi) network positioning device, i.e., the locating can be performed by adopting the GPS device or the wireless network positioning device or the combination of the GPS device and the wireless network positioning device. When the GPS device is adopted for positioning, the mobile terminal calculates the longitude and latitude of the position where the mobile terminal is located by the remote navigation satellites for locating; when the WiFi component is adopted for positioning, the mobile terminal acquires the signals by a plurality of surrounding base stations, and locates the current position of the mobile terminal by the comprehensive calculation according to the positions of a plurality of the base stations.

Meanwhile, the positioning component can also locate the position of the destination preconfigured by the user by means of the GPS navigation and the WiFi navigation.

In the embodiment of the present invention, the direction detection component is a magnetic sensor. Further, the direction detection component is an electronic compass. The electronic compass is configured in the mobile terminal, and it is used for determining the direction of the mobile terminal. In the embodiment of the present invention, the terminal close to the display screen is defined as the front terminal, i.e., the direction that the front terminal of the mobile terminal faces is the direction of the mobile terminal.

However, the electronic compass will effect only if the mobile terminal is placed vertically or horizontally. When the electronic compass is not placed vertically or horizontally, the electronic compass can not detect the current direction of the mobile terminal accurately due to the rotation for a certain angle. Therefore, it is necessary to set an angular speed detection component in the mobile terminal. The angular speed detection component is an angular speed sensor. In the embodiment of the present invention, as it is necessary to detect the angular speed of the rotation of the mobile terminal at the horizontal plane and the vertical plane simultaneously, a three-axis acceleration sensor is adopted as the angular speed detection component in the embodiment of the present invention. When the three-axis acceleration sensor detects the current posture of the mobile terminal, the direction of the electronic compass can be adjusted according to the current posture including the rotation angle and the angular speed thereof. Consequently, the direction of the electronic compass will face to the real direction.

When the angular speed sensor is not configured in the mobile terminal, during the process of using the said system, the mobile terminal must be placed vertically in the condition that the electronic compass and the mobile terminal are configured vertically, or the mobile terminal must be placed horizontally in the condition that the electronic compass and the mobile terminal are configured horizontally. In the embodiment of the present invention, the electronic compass is configured perpendicular to the mobile terminal. Hence, without the corresponding angular speed sensor, the mobile terminal shall be placed perpendicular to the ground when using the said system.

In the embodiment of the present invention, the system generally further comprises an altitude detection component. The altitude detection component may be a barometer which detects the current altitude variation of the mobile terminal based on the air pressure variation to determine the altitude intercept between the mobile terminal and the target position and to detect the current position of the mobile terminal more accurately.

In the embodiment of the present invention, the system further comprises an image capturing device which may be a camera equipped on the mobile terminal. The camera can be provided with an indication device capable of displaying the corresponding indication information on the display screen of the mobile terminal. When the camera faces toward the direction of the target position accurately, the indication device will alert the user, and the user can see the objects around the target position collected by the camera on the display screen. When the camera does not face toward the direction of the target position, the indication device will alert the user by displaying the indication information on the display screen. In the embodiment of the present invention, the indication information may be the indicating arrow.

The above image data for displaying the objects and the corresponding indication information can be shown within a smaller display area at the corner of the display screen to avoid covering the main display area of the route.

Furthermore, in the embodiment of the present invention, the image capturing device can be the camera located at the rear cover of the mobile terminal. The purpose of configuring the camera at the rear cover is to enable the user to observe the image data while collecting the same. Hence, it is necessary to make sure that the camera and the display screen are located at the both two sides of the mobile terminal.

In the embodiment of the present invention, the camera is used for assisting the user to locate the target position that the user wants to seek for.

Figure 2:
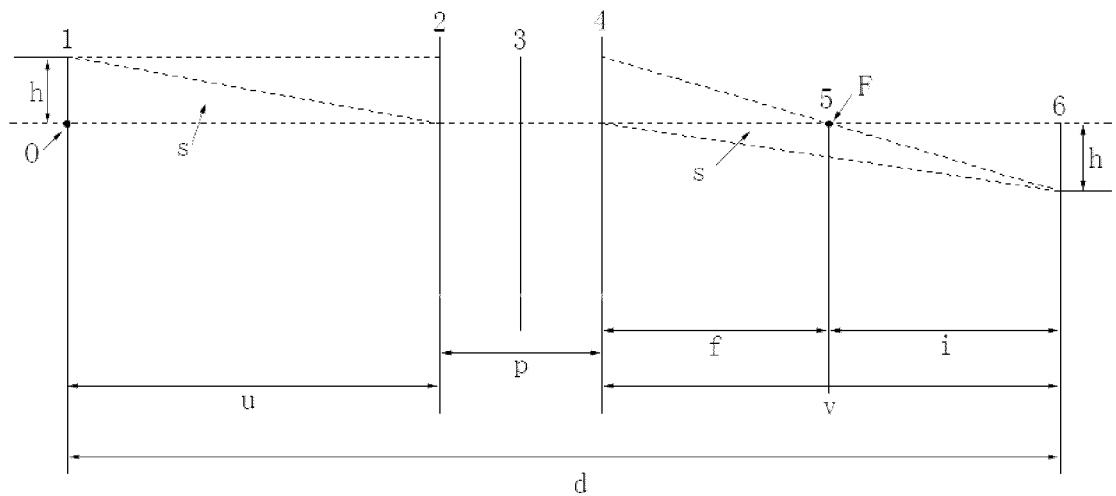
FIG. 2 shows a schematic diagram of the lens imaging.

FIG. 2 shows a schematic diagram of the lens imaging. The height of Object O on the observed Object Plane 1 is h. The imaging height on Imaging Plane 6 is h'. The distance between Object Plane 1 and Imaging Plane 6 is the focus distance d. The distance between Object Plane 1 and Front Main Surface 2 of Lens 3 is the object distance u. The distance between Front Main Surface 2 of Lens 3 and Rare Main Surface 4 is the main point spacing p. The distance between Rare Main Surface 4 of Lens 3 and Imaging Plane 6 is the image distance v. The distance between Rare Main Surface 4 and Focal Plane 5 with the focus F is the focal plane f. The distance between Focal Plane 5 and Imaging Plane 6 is the focal image distance i.

It is necessary to get the focus distance d for the lens imaging. The expression of d is as follows, $$d=u+v+p \quad (1)$$

The magnification of the lens M can be concluded from the two similar triangles s and s' shown in FIG. 2:

$$M=h':h=i:f \quad (2)$$

Hence, as shown in FIG. 2, the actual calculation formula of the focus distance d is that as follows, $$\begin{aligned} d &= u + v + p \\ &= u + f + i + p \\ &= \frac{f+i}{M} + f + i + p \\ &= \frac{f+fM}{M} + f + fM + p \\ &= \frac{f(1+M)}{M} + f(1+M) + p \\ &= \frac{f(1+M)^2}{M} + p \end{aligned} \quad (3)$$

Therefore, for the general lens, the focus distance d between the lens and the object can be calculated according to the focal distance f, the magnification M and the main point spacing p of the lens.

As for the camera on the mobile terminal,
1) As the camera in the mobile terminal generally is the thin lens, i.e., the main point spacing p=0;
2) The object observed by the camera is usually far from the mobile terminals during the auxiliary positioning, where there is no practical sense to locate the object close to the user, the unit of the focal distance is mm, and the distance between the observed object and the mobile terminal is larger. Consequently, the distance between the object and camera is considered to be infinite during the auxiliary positioning, i.e., the focus distance is infinite. At this moment, the imaging of the object is at the focal plane. Similarly, the object far away can be imaged by placing the display screen of the mobile terminal on the focal plane;
3) For a certain camera of the mobile terminal, the focus distance f is knowable;
4) When the image of the object located in a certain place is collected by a certain camera of the mobile terminal, the magnification M is knowable.

Therefore, the focus distance d can be calculated by the formula (3), when the image of the object located in a certain place is being collected.

Figure 3:
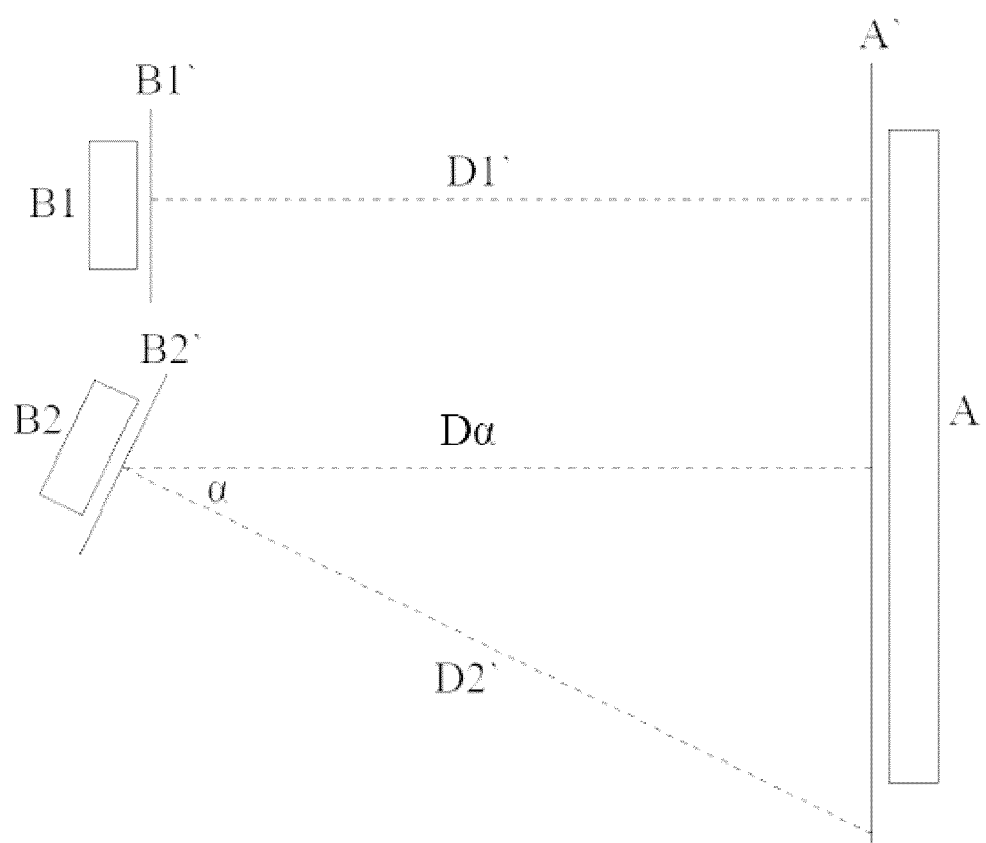
FIGS. 3 to 4 show diagrams of calculating the vertical distance between the projection plane and the image plane in the embodiment of the present invention.

As shown in FIG. 3, when the user uses the camera of the mobile terminal to collect the image data, ideally, the mobile terminal held by the user is parallel to the object image plane of the observed object. A denotes the object to be observed. A' denotes the object image plane. Preferably, the mobile terminal B1 held by the user is parallel to the object image plane A' of the object A, and the focus distance d is the vertical distance D1' between the center of the projection plane Br where the mobile terminal is located and the object image plane A'. The vertical line is also the vertical distance d between the projection plane B1' and the object image plane A'. Therefore, the vertical distance D between the projection plane B1 and the object image plane A' can be calculated directly by the formula (3).

However, in the actual condition, the user often observes the object by different observing angles, i.e., there is a certain horizontal and the vertical angle between the projection plane B2' of the mobile terminal B2 and the object image plane A'. The focus distance d does not equal to the vertical distance D between the center of the projection plane B2' and the object image plane A'. In the embodiment of the present invention, the vertical distance between the projection plane B2' and the object image plane A' is calculated respectively based on the component of the angle α between the projection plane B2' and the horizontal and the corresponding component of the angle β between the projection plane B2' and the vertical.

1) As shown in FIG. 3, for the component of the angle α between the projection plane B2' and the horizontal, the straight-line distance between the center of the projection plane B2' and the object image plane A', i.e., the focus distance d, is D2'. However, the straight-line distance D2' does not equal to the vertical distance D between the center of the projection plane B2' and the object image plane A'. Hence, the vertical distance D is calculated according to D2'. Assuming that the angle between the projection plane B2' and the object image plane A' is α, one end of the segment D2' is located at the center of the projection plane B2' and perpendicular to the projection plane B2'. The segment D2' represents the focus distance d of the camera at this moment; the segment D represents the vertical distance D between the center of the projection plane B2' and the object image plane A'.

By the three-axis acceleration sensor, the system is able to get the component of the angle which forms by rotating the mobile terminal relative to the horizontal. The focal distance f of the camera and the magnification M used for observing the object currently can be acquired. Therefore, according to the formula (3), the system can measure and calculate the focus distance d.

Subsequently, the system uses the formula $$D = d \cos \alpha \quad (4)$$

Finally, when the component of the angle between the projection plane B2' and horizontal is α, the component of the vertical distance $D_\alpha$ between the center of the projection plane B2' and the object image plane A' is calculated.

Figure 4:
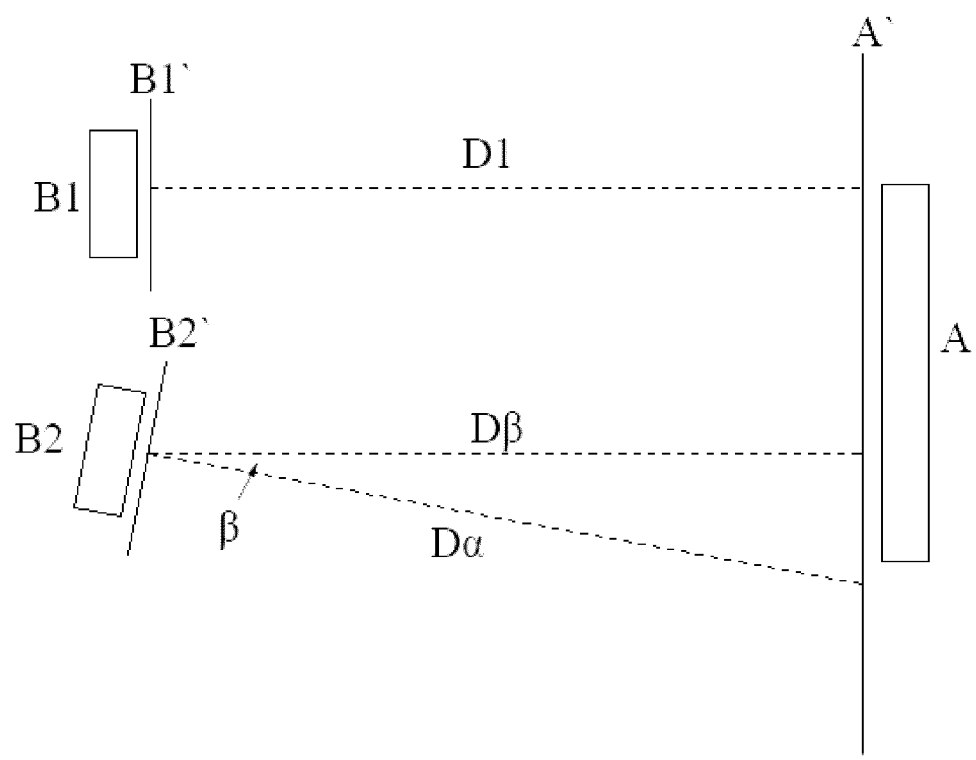

2) Likewise, as shown in FIG. 4, for the component of the angle β between the projection plane B2' and the vertical, the above calculated vertical distance D and the component of the angle β can be substituted into the formula (4) to get the component of the vertical distance $D_\beta$ between the center of the projection plane B2' and the object image plane A', when the component of the angle between the projection plane B2' and the vertical is β.

Subsequently, the system acquires the vertical distance D between the projection plane and the object image plane according to the component of the vertical distance $D_\alpha$ and $D_\beta$.

When the position capturing device captures the current position and the real direction of the mobile terminal and the preconfigured destination position, the position capturing device transmits the data package to the treatment device. The data package includes the above current position, the real direction that the mobile terminal faces to and the position of the destination. The treatment device acquires the route between the current position and the target position according to the map data inside and changes the results according to the current position which is continuously changed and the real direction.

In an embodiment of the present invention, the map data inside the treatment device can be a three-dimensional map model, and what is displayed on the screen is a part of the plane projection of the three-dimensional model. The three-dimensional model is configured with the x-y-z coordinate system. In the embodiment of the present invention, the x-y-z coordinate system is corresponding to the direction of the coordinate system of the object in the real world.

The direction of the mobile terminal is not always pointing to the target position during the navigation, i.e., the target position is not always in front of the user. In the embodiment of the present invention, adopting the latitude and longitude to locate the current location and orientation of the target position, and transforming the latitude and longitude to the corresponding coordinates of the coordinate system on the display screen. Simultaneously, the posture of the mobile terminal will not remain unchanged during the process of locating. Hence, it is necessary to adjust the current position which is acquired and the target position displayed on the display screen by the treatment device to really reflect the direction and the relation between the current position and the target position.

Figure 5:
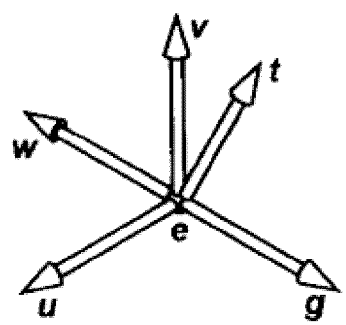
FIGS. 5 to 6 show diagrams of adjusting the coordinate position of the object on the display screen by the treatment device in the embodiment of the present invention.

As shown in FIG. 5, assuming that a vector g is perpendicular to the plane where the display screen of the mobile terminal is located and points to the ground; a vector t is parallel to the plane where the display screen of the mobile terminal is located and points to the sky; and the origin e is the position of the mobile terminal in the current posture.

Subsequently, a u-v-w coordinate system with the origin e is established, wherein the v-axis is located in the plane gt composed of the vector g and the vector t. The w-axis points to the opposite direction with the vector g. The u-axis is perpendicular to the w-v plane.

The coordinate transformation relationship of the above u-v-w coordinate system is:

$$w = \frac{g}{\|g\|} \quad (5)$$
$$u = \frac{t \times w}{\|t \times w\|}$$
$$v = w \times u$$

As the posture of the mobile terminal is changed constantly, the origin e, vector g and vector t will be changed correspondingly. The above u-v-w coordinate system will also be varied with the change of the vector g, the vector t and the origin vector e correspondingly. Therefore, the u-v-w coordinate system actually is the coordinate system representing the posture of the mobile terminal.

Figure 6:
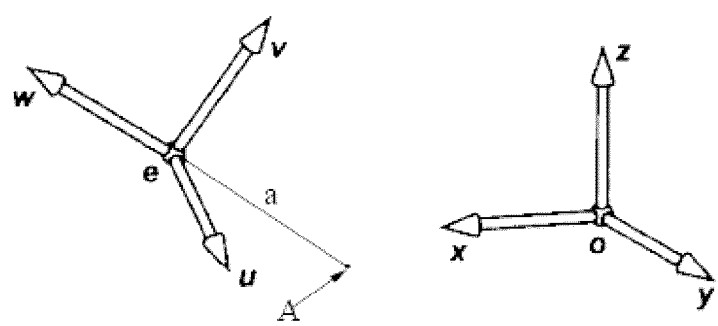

As shown in FIG. 6, it is necessary to acquire the transformation relation between the u-v-w coordinate system and the x-y-z coordinate system during the process of the transformation from the u-v-w coordinate system to the x-y-z coordinate system of the three-dimensional map. Assuming that a line segment a is formed from the origin e to the point A along the opposite direction of the w-axis. The observation transformation formula from the u-v-w coordinate system to the x-y-z system is that as follow, $$M_v = \begin{bmatrix} x_u & y_u & z_u & 0 \\ x_v & y_v & z_v & 0 \\ x_w & y_w & z_w & 0 \\ 0 & 0 & 0 & 1 \end{bmatrix} \begin{bmatrix} 1 & 0 & 0 & -x_e \\ 0 & 1 & 0 & -y_e \\ 0 & 0 & 1 & -z_e \\ 0 & 0 & 0 & 1 \end{bmatrix} \quad (6)$$

In the above formula (6), $(x_u, y_u, z_u)$ represents the relative offset coordinate of the vertex A of the line segment a in the x-y-z coordinate system corresponding to that in the u-axis of the u-v-w coordinate system. $(x_v, y_v, z_v)$ represents the relative offset coordinate of the vertex A in the x-y-z coordinate system corresponding to that in the v-axis of the u-v-w coordinate system. $(x_w, y_w, z_w)$ represents the relative offset coordinate of the vertex A in the x-y-z coordinate system corresponding to that in the w-axis of the u-v-w coordinate system. $(x_e, y_e, z_e)$ represents the relative offset coordinate of the origin e which is located in the u-v-w coordinate system in the x-y-z coordinate system.

For the above formula (6), the three-axis acceleration sensor in the mobile terminal can be adopted to measure and calculate the deflection angle of each coordinate axis in the u-v-w coordinate system relative to the corresponding coordinate axis in the x-y-z coordinate system, i.e., the deflection angle between the mobile terminal and the x-y-z coordinate system along each axis direction. Acquiring the position offset from the origin e of the u-v-w coordinate system to the origin o of the x-y-z coordinate system. Thus, acquiring the above $(x_u, y_u, z_u)$, $(x_v, y_v, z_v)$, $(x_w, y_w, z_w)$ and $(x_e, y_e, z_e)$ in the formula (6) by calculating. Finally, acquiring the $M_v$ by calculating according to the formula (6).

For a certain point p located in the u-v-w coordinate system, the coordinate of the corresponding point in the x-y-z coordinate system can be acquired just by multiplying the coordinate in the u-v-w coordinate system with the $M_v$.

For the target position, it is located in the three-dimensional map of the mobile terminal, and the projection thereof is displayed on the display screen of the mobile terminal. For the above coordinate system, the coordinate of the target position P on the three-dimensional map is the coordinate in the x-y-z coordinate system, which can be calculated as $P(x_p, y_p, z_p)$. The coordinate of the target position P in the u-v-w coordinate system can be calculated as $P(u_p, v_p, w_p)$. The coordinate of the projection of the target position at a projection plane in the u-v-w coordinate system can be calculated as $P_s(u_{ps}, v_{ps}, w_{ps})$. Since the projection plane is parallel to the u-v plane, with the reference to the formulas (5) and (6), $P_s(u_{ps}, v_{ps}, w_{ps})$ can be acquired according to the following formula, $$\begin{bmatrix} u_{ps} \\ v_{ps} \\ w_{ps} \\ 1 \end{bmatrix} = \begin{bmatrix} \frac{d_{es}}{w_p} & 0 & 0 & 0 \\ 0 & \frac{d_{es}}{w_p} & 0 & 0 \\ 0 & 0 & 0 & d_{es} \\ 0 & 0 & 0 & 1 \end{bmatrix} * \begin{bmatrix} u_p \\ v_p \\ w_p \\ 1 \end{bmatrix} \quad (7)$$

In the above formula (7), $d_{es}$ is the coordinate distance from the projection plane to the u-v plane, i.e., the distance from the point of the target position projected on a projection plane to the u-v plane.

Further, substituted into the formula (6) can acquire:

$$\begin{bmatrix} u_{ps} \\ v_{ps} \\ w_{ps} \\ 1 \end{bmatrix} = \begin{bmatrix} \frac{d_{es}}{w_p} & 0 & 0 & 0 \\ 0 & \frac{d_{es}}{w_p} & 0 & 0 \\ 0 & 0 & 0 & d_{es} \\ 0 & 0 & 0 & 1 \end{bmatrix} * M_v * \begin{bmatrix} x_p \\ y_p \\ z_p \\ 1 \end{bmatrix} \quad (8)$$

For the formula (8), since the coordinate distance $d_{es}$ from the projection plane to the u-v plane equals to the coordinate $w_{ps}$ of the projection plane on the w-axis, the coordinate of the target position projected onto the projection plane is calculated as to the plane coordinate $(u_{ps}, v_{ps})$, i.e., the plane coordinate of the target position P which has been transformed and displayed corresponding to the variation of the posture of the mobile terminal on the display screen is $(u_{ps}, v_{ps})$.

In the embodiment of the present invention, the treatment device comprises a storage component which is not shown. The treatment device is connected to the external data storage server by a communication device. The treatment device is used for acquiring the latest map data in the data storage server and storing it in the storage component. The storage component can be a non-volatile memory or a volatile memory. The storage component can also comprise a storage and an internal storage.

FIG. 7 shows the specific steps of the method for guiding the position in the embodiment of the present invention, where it comprises:

Step 1, the positioning component, such as the GPS and/or WiFi component, locates the current position and preconfigured target location of the mobile terminal by the user;

Step 2, the angular speed sensor detects the current posture of the mobile terminal;

Step 3, the magnetic sensor detects the current direction pointed by the mobile terminal;

Step 4, the position capturing device acquires the real direction where the mobile terminal points according to the current posture and the direction of pointing of the mobile terminal;

Step 5, the position capturing device transmits the data package including the above current position, the target position and the real direction of the mobile terminal to the treatment device;

Step 6, the treatment device analyzes the data package and calculates the route formed from the current position to the target position on the preconfigured map data according to the current position, the target position and the real direction of the mobile terminal; and the treatment device displays the result on the display screen of the mobile terminal by combining the real direction of the mobile terminal.

In the above steps, the position capturing device transmits the data package which is updated periodically at intervals of a certain time. The certain time is preconfigured by the developer or configured by the user.

At this time, on the display interface of the mobile terminal, the user will see the route shown on a digital map and the real-time updated direction for moving of the user and the height of the position where the user locates currently (if there is a barometer inside). The above visual data can help the user to find the destination easily.

Although a typical embodiment of a particular structure of the specific implementation way has been given with the above description and the figures, it is appreciated that other changes based on the spirit of this invention may also be made. Though the preferred embodiments are proposed above, these contents will never be the limitation of this invention.

It is obvious for the skilled in the art to make varieties of changes and modifications after reading the above descriptions. Hence, the Claims attached should be regarded as all the changes and modifications which cover the real intention and the range of this invention. Any and all equivalent contents and ranges in the range of the Claims should be regarded belonging to the intention and the range of this invention.

The invention claimed is:

1. A system for guiding the position applied to the mobile terminal, wherein the system comprises a position capturing device and a processing device; the position capturing device is connected to the processing device; the processing device is connected to the display screen of the mobile terminal;

the position capturing device is used to determine the current position of the user and a preconfigured target position; according to an internal map data, the processing device acquires the route between the current position and the target position by treating, wherein the internal map data is a three-dimensional map model which is configured with an x-y-z coordinate system being corresponding to the direction of the coordinate system of the object in the real world, and the target position is located in the three-dimensional map model;

the position capturing device comprises a positioning component, an angular speed detection component and a direction detection component; the positioning component is used to determine the current position and target position of the mobile terminal; the angular speed detection component is used to determine the current posture of the mobile terminal; the direction detection component is used to determine the current direction of the mobile terminal;

the position capturing device acquires the real direction of the mobile terminal according to the current direction and the current posture;

the position capturing device transmits the data package comprising the current position and the real direction to the processing device;

the processing device acquires the route between the current position and the preset target position by treating; and the processing device displays the distance and real direction on the display screen of the mobile terminal;

wherein the system further comprises an image capturing device which is connected to the display screen of the mobile terminal; the image capturing device is used for capturing the image data around the user and displaying the image data on the display screen of the mobile terminal;

wherein the system further comprises an indication device which is connected to the display screen of the mobile terminal; the indication device determines the deviation of the direction between the image capturing device and the target position according to the image data shown on the display screen and alerts the user by displaying the corresponding indication information on the display screen.

2. The system for guiding the position as disclosed in claim 1, wherein, the angular speed detection component is the angular speed sensor of the mobile terminal.

3. The system for guiding the position as disclosed in claim 2, wherein, the angular speed sensor is a three-axis acceleration sensor.

4. The system for guiding the position as disclosed in claim 1, wherein, the direction detection component is a magnetic sensor.

5. The system for guiding the position as disclosed in claim 1, wherein, the image capturing device is a camera.

6. The system for guiding the position as disclosed in claim 1, wherein, the positioning component is a GPS device and/or a wireless network positioning device.

7. The system for guiding the position as disclosed in claim 1, wherein, the position capturing device further comprises an altitude detection component which is used for capturing the current position of the mobile terminal in altitude; the information indicating the current position in altitude is included in the information indicating the current position.

8. The system for guiding the position as disclosed in claim 7, wherein, the altitude detection component is a barometer.

9. A method for guiding the position applied to the mobile terminal, wherein the system for guiding the position as disclosed in claim 1 is adopted, comprises:

Step 1, the positioning component of the mobile terminal locates the current position of the mobile terminal;

Step 2, the direction detection component of the mobile terminal determines the current direction of the mobile terminal;

Step 3, the angular speed detection component of the mobile terminal determines the current posture of the mobile terminal;

Step 4, the position capturing device acquires the real direction of the mobile terminal according to the current direction and the current posture;

Step 5, the position capturing device transmits the data package comprising the current position and the real direction to the processing device; the processing device acquires the route between the current position and the preset target position by treating;

Step 6, the processing device displays the distance and real direction on the display screen of the mobile terminal.

10. The method for guiding the position as disclosed in claim 9, wherein it comprises an image capturing device which is connected to the display screen of the mobile terminal; the image capturing device is used for capturing the image data around the user and for displaying the image data on the display screen of the mobile terminal;

further comprising an indication device which is connected to the display screen of the mobile terminal; the indication device determines the deviation of the direction between the image capturing device and the target position according to the image data shown on the display screen and alerts the user by displaying the indicating arrow on the display screen;

the image capturing device is adopted to capture the surrounding image data and to display the data on the display screen; the image data is provided to the users for confirming the object around the position where the mobile terminal is located;

the indication device marks the indication information of the deviation of the direction between the image capturing device and the target position on the display screen to alert the user according to the image data.

* * * * *